Jan. 13, 1970    V. PLANTE    3,489,452

TRAILER CAMPER

Filed Sept. 8, 1967    5 Sheets-Sheet 1

INVENTOR
Victor PLANTE
BY
Pierre Lespérance
PATENT AGENT

Jan. 13, 1970 V. PLANTE 3,489,452
TRAILER CAMPER

Filed Sept. 8, 1967 5 Sheets-Sheet 2

INVENTOR
Victor PLANTE
BY
Pierre Lespérance
PATENT AGENT

FIG. 9

INVENTOR
VICTOR PLANTE
BY Smart & Biggar
ATTORNEYS

Jan. 13, 1970      V. PLANTE      3,489,452

TRAILER CAMPER

Filed Sept. 8, 1967      5 Sheets-Sheet 4

FIG.10.

INVENTOR
VICTOR PLANTE
BY *Smart & Biggar*
ATTORNEYS

INVENTOR
VICTOR PLANTE
BY *Smart & Biggs*
ATTORNEYS

United States Patent Office 3,489,452
Patented Jan. 13, 1970

3,489,452
TRAILER CAMPER
Victor Plante, Valcourt, Quebec, Canada
Continuation-in-part of application Ser. No. 518,153
Jan. 3, 1966. This application Sept. 8, 1967, Ser.
No. 675,730
Int. Cl. A45f 1/00; B60p 3/32
U.S. Cl. 296—23                                            19 Claims

ABSTRACT OF THE DISCLOSURE

A wheel-mounted trailer camper comprising an open top box and a cover, each having lateral walls of uneven height and inclined end walls extending from the higher of the said lateral walls to the lower of said walls. The higher lateral wall of the cover is hinged to the lower lateral wall of the box, the box containing a collapsible tent-supporting framework pivotally connected thereto for carrying a tent which is attached to the box and cover. The framework comprises a central U-shaped frame pivotally connected to the box and a pair of lateral U-shaped frames, the central frame carrying two pairs of short arms pivotally connected thereto by means of a sleeve and which are also pivotally connected to the lateral U-shaped frames. The sleeve moves upwardly along the central frame to thereby force the lateral frames outwardly during opening of the camper so as to cause the tent to become taut in the fully erected position, and moves downwardly during closure of the camper to bring the lateral arms into close proximity with the central arm for compactness.

This application is a continuation-in-part of application Ser. No. 518,153, filed Jan. 3, 1966, and now abandoned.

This invention relates to a trailer camper of the type comprising a wheel-mounted open top box, a cover for closing said box hinged to the latter, a tent secured to the box and cover periphery, a tent-supporting framework mounted in the box and arranged to automatically open and extend the tent in taut condition upon opening of the cover. Said tent-supporting framework is characterized by a central U-shaped frame and a pair of lateral U-shaped frames, the central frame pivoted to the box and carrying two pairs of short arms pivotally connected thereto, the lateral U-shaped frames pivoted to said arms, sleeve means mounted on the central U-shaped frame and linked to said arms to pivot the same, so as to push the lateral frame outwardly to cause the tent to become taut in the fully open position of the cover.

The trailer camper in accordance with the invention is also characterized by motor means for opening and closing the cover, said motor means actuating arms pivoted in the box and engageable with the cover to open the same to an intermediate position in which its center of gravity is past the outside of the hinged connection, said motor means actuating cable means to close the cover to a second intermediate position in which the center of gravity of the cover lies inside the hinged connection, the motor means for closing the cover serving as retarding means during the final opening movement of the cover and motor means for opening the cover serving as retarding means during the final closing movement of the cover.

The present invention relates to camping equipment and, more particularly, to a wheeled vehicle adapted to be pulled by a passenger motor vehicle and which opens up to form a tent.

The general object of the present invention resides in the provision of a trailer camper of the above-noted type, so arranged that the entire cover of the trailer forms a floor at practically ground level, free of any obstructions, and additional to the floor area provided by the bottom of the trailer proper, to thereby provide a tent having a floor area which is double the size occupied by the trailer in closed position.

Another object of the present invention resides in the provisions of a trailer camper of the character described, in which the tent is automatically erected upon opening of the cover and is automatically retracted and folded within the trailer upon closing of the cover.

Another object of the present invention resides in the provision of a trailer camper of the character described, in which the tent is automatically stretched taut upon erection of the same.

Another object of the invention resides in the provision of a trailer camper of the character described, which is power-operated from the car battery, whereby the trailer may be open and closed upon simple operation of a button and lever.

Another object of the present invention resides in the provision of a trailer camper of the character described, which is power-operated by hydraulic cylinders, which also acts as shock absorber and movement-retarding means for the cover during its opening and closing movement.

In another aspect the invention provides a trailer camper comprising a wheel mounted open top box, hitching means secured to said box for hitching the latter to a towing vehicle, a cover for closing said box, said box and cover having lateral walls with unequal height, and inclined end walls extending from said higher of said lateral end walls to lower of said lateral walls, the higher lateral wall of said cover being hinged to a lower lateral wall of said box, said cover being pivotable relative to said box between a closed position in which said walls fit one another in substantial alignment, and an open position in which said cover lies in side by side relationship and parallel with said box in upside down position at a lower level than the bottom of said box, a tent supporting framework mounted in said box and a tent carried by said framework and attached to said box and cover, a linkage between the box and the cover and between the frame members of the framework, and fluid operable motor means connected to said linkage and operable to move the cover relatively to the box between a closed position and a open position and to erect and collapse the framework during those movements.

From a further aspect the invention provides a trailer camper comprising an open top box, a cover hingedly connected to the box and movable between a first position in which it closes the box and a second position in which it is in side by side relationship with the box and in a plane generally parallel with the plane of the base of the box, an extensible linkage connecting the box and the cover and comprising a first lever pivotally connected to the box and a second lever pivotally connected to the cover, a pivotal connection between the first and second levers and a double-acting piston and cylinder connected to the linkage and operable to move the cover to its first position from its second position upon operation in one direction and to its second position from its first position upon operation in the other direction.

The foregoing and other important objects of the present invention will become more apparent during the following disclosure and by referring to the drawings, in which.

Referring now more particularly to the drawings in which like reference characters indicate like elements throughout, the trailer camper in accordance with the invention comprises a box 1, of generally rectangular shape, and to one longitudinal side of which is hinged at 2, by means such as a piano hinge, a cover 3 fitting over box 1 and completely closing the same.

Box 1 and cover 3 are preferably made of synthetic resin reinforced with glass fibre. Box 1 is mounted on a steel frame 4 protruding from the forward end of the box and forming a V terminated by the usual socket 5 adapted to be hitched to the usual spherical hitching member secured to the back of a motor vehicle.

The frame 4 is mounted on tire wheels 6 which are interconnected by a cross axle 7 carried by the usual springs 8 secured at their ends to frame 4.

A cross bar 9, at the front of box 1, reinforces frame 4 and also serves to carry a spare tire wheel 10. A leg 11 is pivoted to the front of the V of frame 4 and is retained in the plane of the frame 4 by a lock stem 12. Upon pulling on lock stem 12, leg 11 is allowed to drop onto the ground to maintain box 1 level.

The front and back walls 13 of box 1 are downwardly inclined towards the longitudinal wall 14, which is hinged to cover 3. Longitudinal wall 14 is much lower than the opposite longitudinal wall 15.

Similarly, the front and back walls 15 of cover 3 are downwardly inclined away from longitudinal wall 17 hinged to box 1. Thus, this wall is much higher than the opposite wall 18 and at such a height that, in the fully open position of cover 3, the latter will rest on the ground beside the box 1, by means of its longitudinally extending ribs 19. Box 1 is preferably stayed before opening cover 3.

Figure 1:
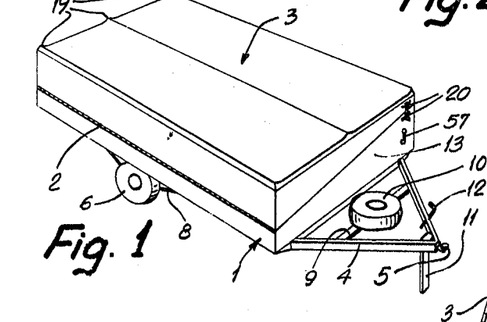
FIGURE 1 is a perspective view of the trailer camper in closed position.

The edges of the walls of the box and cover fit each other to form a substantially water-proof closure and the cover is latched in closed position by suitable latches 20, shown in FIGURE 1, and disposed at the back and front of the trailer.

A bracket 21 is rigidly secured to the floor of box 1 at its front and back corners adjacent lower longitudinal wall 14. On the two brackets 21 are pivoted at 22 the ends of the legs of an inverted tubular U-shaped frame 23. In the fully open position of the cover 3, U-shaped frame 23 is substantially vertical at substantially the middle of the floor area provided by the bottom of box 1 and cover 3.

A pair of oppositely-directed short arms 24, of tubular metal construction, are pivoted at 25 to the legs of U-shaped frame 23 a slight distance above hinge 2. The short arms 24 are in a place parallel to the front and back walls of the box and cover.

A sleeve 26 is slidably mounted on the legs of U-shaped frame 23 intermediate pivots 22 and 25. A pair of links 27 are pivotally connected to sleeve 26 and to short arms 24 intermediate the outer ends thereof.

A pair of U-shaped tubular frames 28 have their legs pivoted to the outer ends of short arms 24 at the front and back of the trailer and, in the fully erected position of the tents, extend outwardly and upwardly from the central U-shaped frame 23.

A tent 29 is laid over the three frames 23 and 28 and has its lower edges secured to the longitudinal wall 15 of box 1 and longitudinal wall 18 of cover 3 inside thereof and its roof is secured to the bights of frames 23 and 28.

The tent 29 is supported by the U-shaped frames and also serves to pivot said U-shaped frames to their final erected position upon opening movement of the cover 3. The back and front walls of the tent are secured at their lower edges to the back and front walls of box 1 and cover 3.

Figure 2:
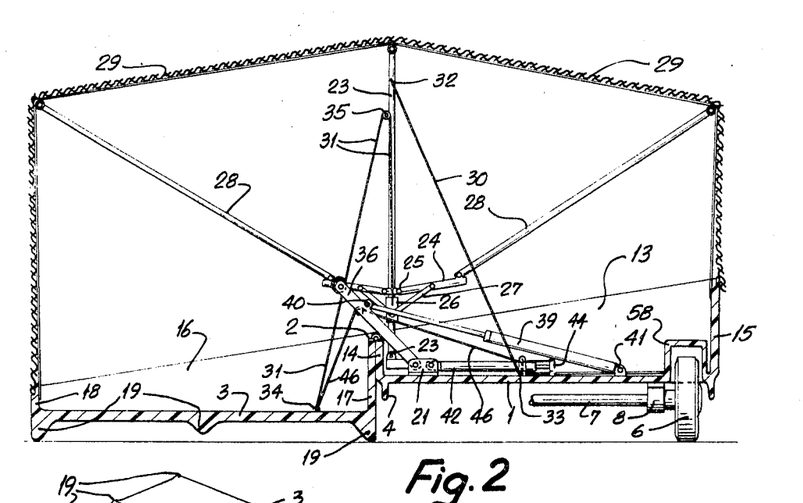
FIGURE 2 is a cross-section of same, in fully open and tent-erected position.
Figure 3:
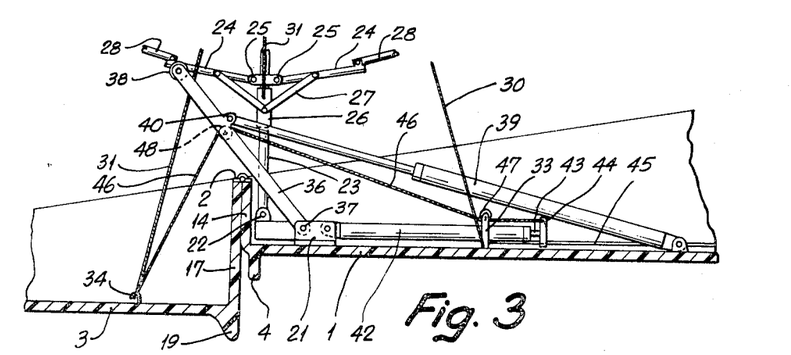
FIGURE 3 is a partial cross-section, on an enlarged scale, showing the hydraulic cylinders and mechanism for opening and closing the cover and erecting the tent.

In the erected position of the tent, central U-shaped frame is maintained in upright position by means of guy wires 30 and 31 at the front and back of box 1. Each guy wire 30 is attached at one end to U-shaped frame 23 near the top thereof at 32 and at its lower end to a bracket 33 secured to the floor of box 1. Each guy wire 31 is secured at 34 to the back or front wall 15 of cover 3, is trained on a pulley 35 carried by the leg of U-shaped frame 23 and extends downwardly along said leg to be finally attached to sleeve 26. Thus, guy wire 31 serves not only to maintain the central U-shaped frame 23 in upright position, but also to raise sleeve 26 along the leg of said frame 23 until it abuts against the bracket having the pivotal connection 25 of the short arms 24, which is the position of sleeve 26 assumed in the fully open position of cover 3, as shown in FIGURE 2.

In this position, the short arms 24 are slightly inclined upwardly, causing the lateral U-shaped frame 28 to stretch somewhat the canvas of the tent 29 to maintain the latter in taut condition.

Figure 4:
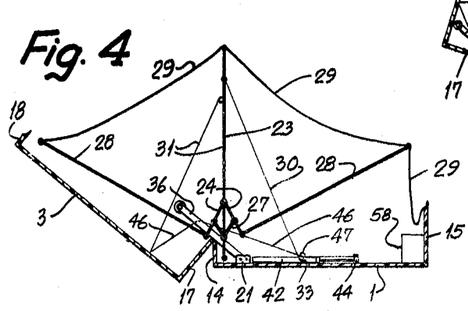
FIGURES 4, 5, 6, and 7 are cross-sections, in somewhat schematic view, showing different stages of the closing or opening movement of the cover and collapsing or erecting of the tent.

Upon starting of the closing movement of cover 3, each guy wire 31 becomes loose, as shown in FIGURE 4, whereby the weight of the tent 29 causes the lateral U-shaped frames 28 to cause downward pivotal movement of short arms 24 and, consequently, downward sliding movement of sleeve 26 along the leg of central frame 23.

A rigid cover opening arm 36 is pivoted at 37 on each bracket 21 and has its free end provided with an idle wheel 38 adapted to engage the bottom of cover 3. Each of the two arms 36 is power-operated by a hydraulic cylinder and piston unit 39, of the single-acting type, the piston rod of which is pivoted at 40 near the top end of arm 36, while the cylinder proper is pivoted at 41 to the floor of box 1 near higher wall 15.

A cover closing hydraulic cylinder and piston unit 42 is disposed along the floor of box 1 at each end of said box. Each cylinder 42 is attached to bracket 21 at one end and to floor-anchored bracket 33 at its other end, while its piston rod 43 is secured to a slide 44 slidably engaging and guided by a rod 45 extending along the floor of the box and secured thereto at its two ends and disposed below the piston rod 44.

A steel cable 46 is attached at one end to guide 44, is trained on a pulley 47 secured to bracket 33 and on a pulley 48 mounted near the outer end of cover opening arm 36 and is attached to cover 3 at 34.

Figure 8:
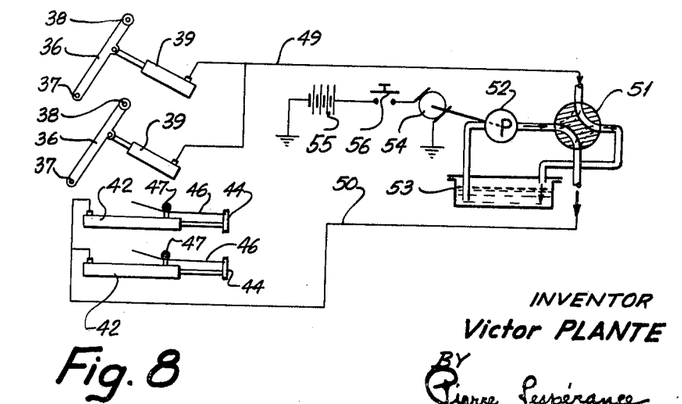
FIGURE 8 is a schematic view of the electric and hydraulic circuits.

As shown in FIGURE 8, both cylinders 39 and 42 are of the single-acting type and are hydraulically connected by fluid lines 49 and 50 respectively to the outlet ports of a two-way valve 51 having a pressure port connected to a fluid pump 52 and a return port connected to a fluid reservoir 53, said reservoir being also connected to the intake of pump 52 and to two return ports of valve 51.

Pump 52 is driven by an electric motor 54 connected to the car battery 55 through a push button switch 56. The hydraulic circuit may be further provided with a relief valve, if so desired.

Push botton switch 56 is mounted on the front wall of box 1, as shown in FIGURE 1, together with a lever 57 for operating valve 51. It is seen that valve 51, in one position of lever 57, allows pressure fluid to go to cylinder 39, while simultaneously fluid is allowed to discharge from the other cylinder 42 back into reservoir 53. In the alternate position of lever 57, the reverse takes place, that is cylinder 42 is operating while fluid in the other cylinder 39 is returning to the reservoir.

It will be appreciated that the return lines from valve 51 to the reservoir 53 may be as small as desired to slow down the return stroke of the cylinders 39 and 42.

Supposing the trailer camper is in fully open position, as shown in FIGURE 2, upon closing of push button switch 56 and operation of lever 57 so as to actuate cylinder 39 and connecting the cylinder 42 to reservoir 33, cylinder 42 will extend to thereby pull on cable 46, which initiates closing movement of cover 3, as shown in FIGURE 4. Cover 3, upon raising, causes the tent 29 to fold and the U-shaped frames 23 and 28 to pivot towards box 1. As soon as cover 3 starts to close, guy wire 31 becomes loose and allows downward movement of sleeve 26 and, therefore, downward pivotal movement of short arms 24, as shown in FIGURE 4.

Figure 5:
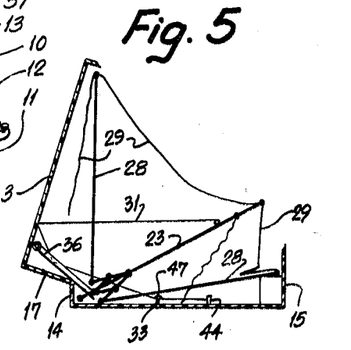
Figure 6:
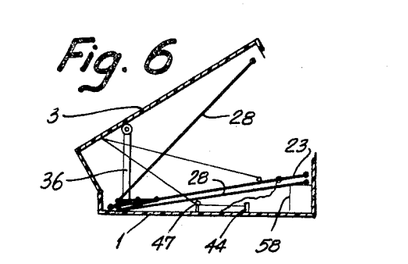

Further closing of cover 3 under the pull exerted by cables 46 under the action of cylinders 42 finally causes the idle wheels 38 at the ends of cover opening arms 36 to engage the bottom of cover 3, as shown in FIGURE 5. In this connection, it will be noted that arms 36 have been maintained in their inclined position, shown in FIGURES 4 and 5, due to the downward pull exerted on said arms by the cables 46.

When arms 36 contact the bottom of cover 3 during the closing movement of the latter, the center of gravity of cover 3 is still on the outside of hinge 2, so that the cover engages the arms 36 in a smooth manner. Further pulling by cable 46 causes clockwise rotation of arms 36 and therefore retraction of cylnders 39. The center of gravity of cover 3 then passes on the inside of hinge 2 and the cover further closes under its own weight, but this closing movement is retarded by the arms 36, the clockwise pivotal movement of which is slowed down by the fact that the cylinders 39 have to be discharged of their fluid through valve 51.

During the final phase of the closing movement, the U-shaped frames 23 and 28, together with the tent 29, pivot downwardly and fold neatly on top of a compartment 58 disposed alongside the higher wall 15 of box 1.

Figure 7:
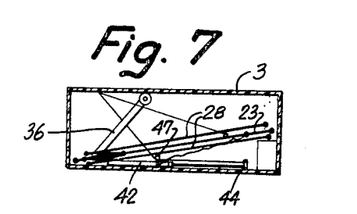

In the fully closed position of the cover 3, shown in FIGURE 7, the bights of the three frames 23 lie side by side on top of compartment 58 and arms 36 are fully retracted but still in contact with the bottom of cover 3.

To open the cover 3 and erect the tent, the reverse procedure is effected. Lever 57 is operated to admit pressure fluid to cylinder 39 and to connect the cylinder 42 to reservoir 33. Push button switch 56 is closed whereby cover opening arms 36 pivot in anticlockwise movement to open cover 3 until its center of gravity is on the outside of hinge 2. Then cables 46 take over and retard the further opening movement of cover 3 until the latter reaches the ground, the steel cable 46 causing retraction of cylinders 42 and discharge of their fluid into reservoir 53.

During the opening movement of the cover 3, the tent attached to said cover will cause automatic erection of the frames 23 and 28 and the guy wires 31 will finally cause raising of sleeve 26 and upward movement of short arm 24 and, therefore, outward and upward movement of lateral U-shaped frame 28 to thereby make the tent taut.

In the final open position of the tent, the central frame 23 is maintained in upright position by guy wires 30 and 31, which are not taut. The tent 29 is provided with the desired number of windows and with a doorway in its wall attached to the lower outer longitudinal wall 18 of cover 3.

Cover 3, in open position, forms a relatively large floor area free of any obstructions and camping tables, chairs, and the like may be positioned thereon together with cots, if so desired. The floor area of box 1 may be provided with permanent beds, a sink, a stove, refrigerator and the like, permanently secured thereto, while compartment 58 serves as storage. Said box 1 may yet receive a large quantity of additional camping equipment.

The embodiment of FIGURES 9 to 12 includes a tent-supporting frame rather similar to that of the embodiment of FIGURES 1 to 8 and for ease of cross reference like parts are identified in both embodiments by like reference numerals, also, for the sake of bravity, only those parts of the trailer of FIGURES 9 to 12 which are not common to both embodiments are described hereinafter.

As will be apparent from the drawings the actual tent-supporting framework of the second embodiment is basically similar to that of the first embodiment except that there are also included short U-shaped frame members 100 which are pivotally connected to ears 101 secured at a position intermediate the ends of the limbs of the U-shaped members 28. The parts of the U-shaped members 100 interconnecting the limbs of those members are secured to the fabric 29 of the tent so that as the tent is erected, in a manner to be described hereinafter, tension in the tent fabric causes those U-shaped members 100 to adopt the position shown in FIGURE 9. As the fabric of the tent becomes slack during the collapsing operation the members 100 will adopt the position shown in FIGURE 10.

The opening and closing of the cover is effected by means of a double-acting cylinder and piston device 102 and a linkage which is generally indicated at 103. The linkage comprises a first lever 105, which in practice can consist of two parallel and slightly spaced apart arm members, one end of which is pivoted to an upstanding ear 106 secured to the cover 3 of the camper trailer. At that end of the lever 105 remote from its connection to the cover 3, there is pivotally connected a lever 106, which in the case where the lever 105 is constituted by two spaced apart arms, will be pivoted between those two arms on a pivot extending between the two arms. That end of lever 107 remote from the connection to lever 105 is pivoted between a pair of spaced ears 108 secured to the box 1.

Intermediate the connection of lever 105 to the cover 3 and the connection of that lever to lever 107, a third lever 109 is pivoted. The free end of that lever is pivotally connected to a fourth lever 110, which preferably will comprise two parallel and spaced apart arms and at a point intermediate the ends of lever 110, that lever is pivotally connected to a point intermediate the ends of lever 107. At that end of the lever 110 remote from its connection to lever 109 there is connected the piston rod 111 of the piston and cylinder device 102.

The cylinder 112 of the piston and cylinder unit 102 is pivotally connected to the base of the box by a pair of ears 113.

Figure 9:
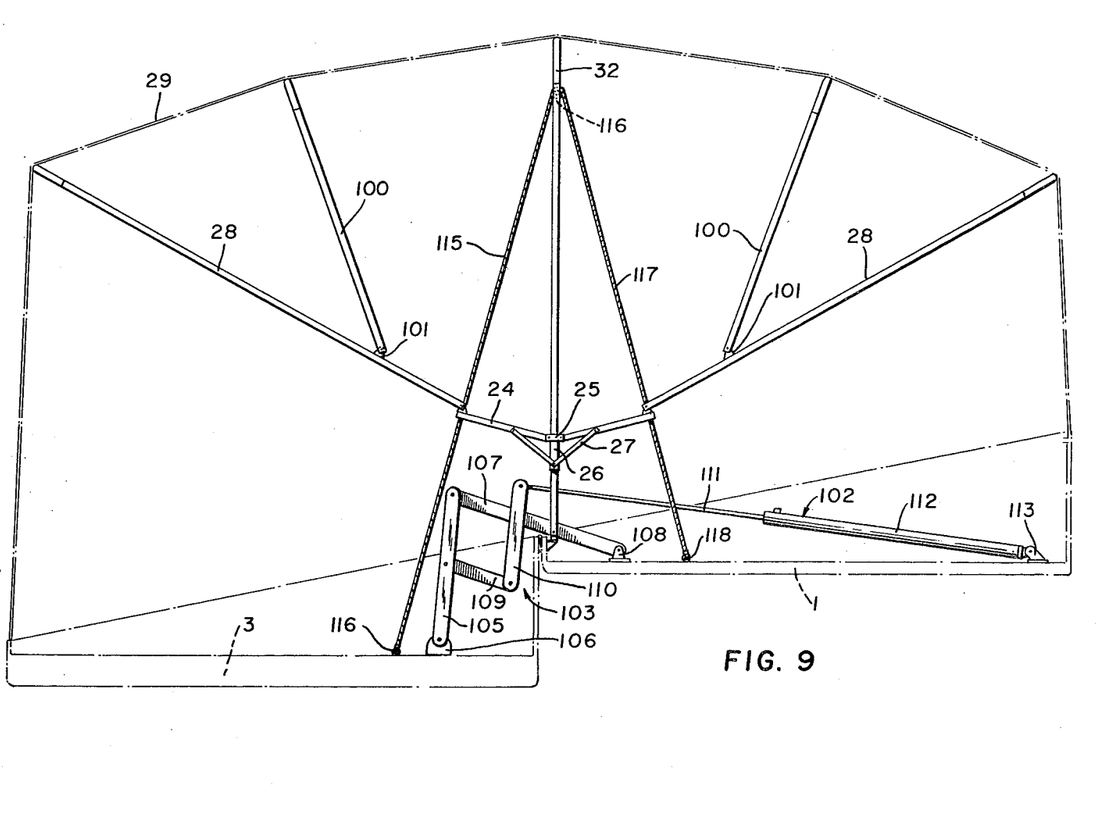
FIGURE 9 is a cross-section of a second embodiment of the trailer camper, which includes a double-acting piston.
Figure 10:
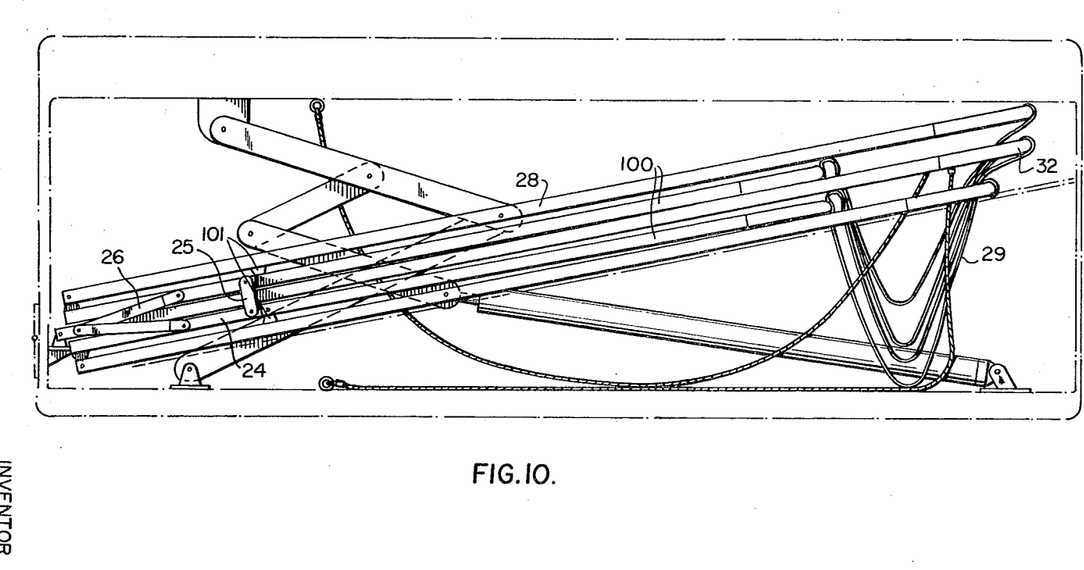
FIGURE 10 is a cross-section, on a somewhat larger scale than that of FIGURE 9 in which the camper trailer is shown in the collapsed position.

It will thus be seen that the four levers 105, 107, 109 and 110 constitute a lazy tong or toggle connection between the box 1 and the cover 3 of the camper trailer. Referring now particularly to FIGURE 9 it will be seen that as the piston rod 111 is retracted into the cylinder 112 the lazy tong linkage will cause the cover 3 to be pivoted through 180° to close the box. Similarly it can be seen that the reverse action will occur when the piston rod is extended from the position shown in FIGURE 10.

Of course with the different methods of opening the cover a simpler method of erecting the tent can be adopted than in that of the embodiment of FIGURES 1 to 8. This consists in a single pulley wire 115 of which one end is secured by an eyelet 116 to the cover 3 at a point spaced from the vertical projection of the limbs of the U-shaped frame member 32 and the other end of which is secured to the tubular sleeves 26. The cable 115 is trained over a pulley 116 mounted close to the upper ends of the limbs of the frame member 32. In this way as the cover is opened, tension in the cable 115 will cause the sleeve 26 to be raised and thus the tent frame to be erected in a fashion similar to that described with reference to the embodiment of FIGURES 1 to 8. A cable 117 secured by an eyelet 118 to the base of the box 1 and to the limbs of the frame member 32 positioned close to the pulley 116, acts as a guy for that frame member when the frame is erected. Of course, in a similar fashion to that described with the first embodiment of the invention the tension in the tent fabric supports the other frame members.

Figure 11:
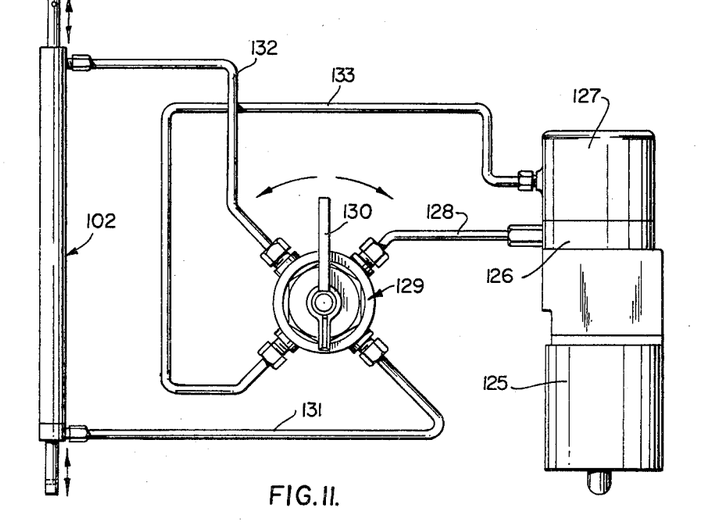
FIGURE 11 is a schematic diagram of the hydraulic circuitry associated with the double acting piston.

The hydraulic circuitry associated with the double-acting piston, whilst somewhat different to that associated with the arrangement of the embodiment of FIGURES 1 to 8 is simple and consists of a motor 125 drivingly connected to a pump 126. The reservoir 127 is, for compactness, mounted atop the pump 126. A pressure fluid line 128 connects the pump to a valve 129 which by means of a control handle 130, the particular operation of which is described in detail hereinafter, may be connected via lines 131 to 132 to either side of the piston of the piston and cylinder unit 102. In the position of the valve control member in which the line 128 is connected to the line 131, i.e., to the lower side of the piston of piston and cylinder unit 102, then the line 132 will be connected, through appropriate ports within the valve control member to line 133 which connects the valve to the reservoir 127. In the position where the valve control member connects line 128 with line 132 then of course the line 131 will be connected to line 133 and hence to reservoir 127.

Figure 12:
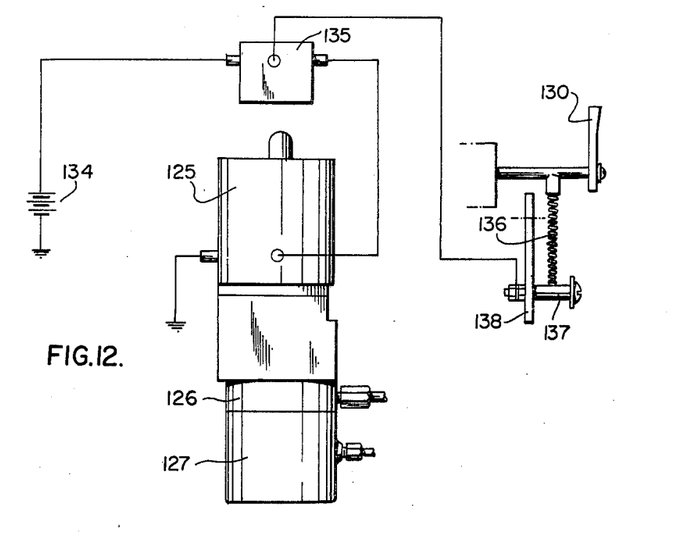
FIGURE 12 is a schematic view of the electrical circuitry associated with the hydraulic circuitry and including the actuating means.

The electric motor 125 is powered by the electric battery of the towing vehicle and is indicated, schematically, at 134 in FIGURE 12. An appropriate socket connection is provided on the forward end of the trailer to make the connection between a switch on the trailer which in turn controls actuation of the motor 127. The same socket is also employed to make the connections between the lights of the trailer.

The electrical switch is conveniently embodied on the housing including valve 129 and is actuable by the actuating member 130.

The electrical circuit includes a solenoid switch 135 which can be energized and de-energized upon the making and breaking of switch contacts constituted by a spring 136 and post 137 which is carried by a control lever 138 which is mounted on a convenient moving part of the trailer. In the closed position of the lever, turning the control handle 130 to a position in which the valve control member is moved to connect the line 128 to that side of the piston to extend the piston rod completes the circuit by making contact between spring 136 and post 137 thus to energize solenoid switch 135 and actuate the motor 125. The lever 138 is arranged so that contact between post 137 and spring 136 is broken when the cover reaches an over-center position so that the motor is switched off at that point. Thereafter the cover will continue to open under its own weight but slowly because of the resistance of the hydraulic fluid on the outer side of the piston of the piston and cylinder unit 102.

Similarly, the control lever 138 is arranged so that when the control handle 130 is moved into a position in which it connects line 128 with the outer side of the piston to retract the piston rod into the cylinder then the contacts 136 and 137 will be made and the motor energized. The control lever 138 is positioned so that again contact between spring 136 and post 137 is broken at a position in which the cover is over center, this time over center towards the box, so that again the cover will close the box against the resistance of the hydraulic fluid in the piston and cylinder unit 102.

It will be appreciated that by the adoption of the second embodiment savings are made inasmuch as the linkage is simplified and the number of cables and pulleys is reduced. Further of course the cost of two separate return cylinders is avoided.

It is of course to be appreciated that the linkage and piston described herein with reference to FIGURES 9 and 12 will generally be duplicated at each end of the trailer.

While a preferred embodiment in accordance with the invention has been illustrated and described, it is understood that various modifications may be resorted to without departing from the scope of the appended claims.

What I claim as my invention is:

1. A trailer camper comprising a wheel-mounted open top box, hitching means secured to said box for hitching the latter to a towing vehicle, a cover for closing said box, said box and cover having lateral walls of unequal height, and inclined end walls extending from the higher of said lateral walls to the lower of said lateral walls, the higher lateral wall of said cover hinged to the lower lateral wall of said box, said cover pivotable relative to said box between a closed position in which said walls fit one another in substantial alignment, and an open position in which said cover lies on the ground beside said box in upside down position at a lower level than the bottom of said box, a tent-supporting framework mounted in said box and a tent carried by said framework and attached to said box and cover, said framework and tent automatically taking an erected position upon opening of said cover and automatically taking a collapsed position upon closing of said cover and stored in the closed box, power-operated means to open and close said cover, including arms pivotally mounted in said box near said box lower lateral walls for movement in vertical planes with the outer ends of said arm engaging with said cover, first motor means for pivoting said arms to cause opening of said cover to a first intermediate position in which its center of gravity lies outside of said hinged connection, cable means attached to said cover, pulleys mounted near the outer end of said arms and on which said cables are trained, and second motor means in said box for pulling on said cables to cause closing of said cover from its fully open position to a second intermediate position in which the center of gravity of said cover lies inside of said hinged connection.

2. A trailer camper as claimed in claim 1, wherein said first and second motor means include movement-retarding means, the retarding means of said second motor means retarding the opening movement of said cover from said first intermediate position to its fully open position, the retarding means of said first motor means retarding the closing movement of said cover from said second intermediate position to its fully closed position.

3. A trailer camper as claimed in claim 2, wherein said motor means include single-acting hydraulic cylinder and piston units and said retarding means being provided by the rate of emptying of fluid from said cylinders and piston units upon the return stroke of said units.

4. A trailer camper as claimed in claim 1, in which said tent-supporting framework includes inverted U-shaped frames disposed longitudinally of said box and including a central frame and a pair of lateral frames, the legs of said central frame being pivotally connected to said box adjacent the back and front thereof and adjacent the lateral wall of said box hinged to said cover, a pair of short arms pivotally connected at one end to each leg of said central U-shaped frame, the legs of said lateral U-shaped frames being pivotally connected to the outer ends of said arms, a sleeve slidably mounted on each leg of said central U-shaped frame, links pivotally connecting said sleeve to said short arms, cable means attached to said cover and to said sleeve and trained intermediate their ends to the legs of said central frame above the pivotal connection of said short arms to said central frame, said last-named cable means causing, during opening of said cover, upward movement of said sleeve, which in turn causes upward pivotal movement of said short arms and outward movement of said lateral U-shaped frames to thereby cause said tent to take a taut position in the fully open position of said cover.

5. A trailer camper as claimed in claim 4, wherein said last-named cable means also serve to stay said central frame in upright position in the fully open position of said cover, and including guy wires attached to said box and to said central frame and staying said central frame in upright position.

6. A trailer camper comprising a wheel-mounted open top box, hitching means secured to said box for hitching the latter to a towing vehicle, a cover for closing said box, said box and cover having lateral walls of unequal height, and inclined end walls extending from the higher of said lateral walls to the lower of said lateral walls, the higher lateral wall of said cover hinged to the lower lateral wall of said box, said cover pivotable relative to said box between a closed position in which said walls fit one another in substantial alignment, and an open position in which said cover lies on the ground beside said box in upside down position at a lower level than the bottom of said box, a tent-supporting framework mounted in said box and a tent carried by said framework and attached to said box and cover, said framework and tent automatically taking a collapsed position upon closing of said cover and stored in the closed box, said tent-supporting framework including inverted U-shaped frames disposed longitudinally of said box and including a central frame and a pair of lateral frames, the legs of said central frame being pivotally connected to said box adjacent the back and front thereof and adjacent the lateral wall of said box hinged to said cover, a pair of short arms pivotally connected at one end to each leg of said central U-shaped frame, the legs of said lateral U-shaped frames being pivotally connected to the outer ends of said arms, a sleeve slidably mounted on each leg of said central U-shaped frame, links pivotally connecting said sleeve to said short arms, cable means attached to said cover and to said sleeve and trained intermediate their ends to the legs of said central frame above the pivotal connection of said short arms to said central frame, said last-named cable means causing, during opening of said cover, upward movement of said sleeve, which in turn causes upward pivotal movement of said short arms and outward movement of said lateral U-shaped frames to thereby cause said tent to take a taut position in the fully open position of said cover.

7. A trailer camper as claimed in claim 6, wherein said last-named cable means also serve to stay said central frame in upright position in the fully open position of said cover, and including guy wires attached to said box and to said central frame and staying said central frame in upright position.

8. A trailer camper comprising a wheel-mounted open top box, hitching means secured to said box for hitching the latter to a towing vehicle, a cover for closing said box, said cover and box having a hinged connection for pivotal movement of said cover between a closed position and an open position in which latter position, said cover is adapted to lie on the ground besides the box and in upside down position at a lower level than the bottom of the box, a tent-supporting framework mounted in said box and a tent carried by said framework and attached to said box and cover, said framework and tent automatically taking an erected position upon opening of said cover and automatically taking a collapsed position upon closing of said cover and stored in the closed box, means to open and close said cover including arms pivotally mounted in said box near said hinged connection for movement in vertical planes with the outer ends of said arms engaging with said cover, motor means for pivoting said arms to cause opening of said cover to a first intermediate position in which its center of gravity lies outside of said hinged connection, cables means attached to said cover, pulleys mounted near the outer end of said arms and on which said cables are trained, and second motor means in said box for pulling on said cables to cause closing of said cover from its fully open position to a second intermediate position in which the center of gravity of said cover lies inside of said hinged connection.

9. A trailer camper as claimed in claim 8, wherein said first and second motor means include movement retarding means, the retarding means of said second motor means retarding the opening movement of said cover from said first intermediate position to its fully open position, the retarding means of said first motor means retarding the closing movement of said cover from said second intermediate position to its fully closed position.

10. A trailer camper as claimed in claim 9, wherein said motor means include single-acting hydraulic cylinder and piston units and said retarding means being provided by the rate of emptying of fluid from said cylinders and piston units upon the return stroke of said units.

11. A trailer camper as claimed in claim 8, in which said tent-supporting framework includes inverted U-shaped frames disposed longitudinally of said box and including a central frame and a pair of lateral frames, the legs of said central frame being pivotally connected to said box adjacent the back and front thereof and adjacent said hinged connection, a pair of short arms pivotally connected at one end to each leg of said central U-shaped frame, the legs of said lateral U-shaped frames being pivotally connected to the outer ends of said arms, a sleeve slidably mounted on each leg of said central U-shaped frame, links pivotally connecting said sleeve to said short arms, cable means attached to said cover and to said sleeve and trained intermediate their ends to the legs of said central frame above the pivotal connection of said short arms to said central frame, said last-named cable means causing, during opening of said cover, upward movement of said sleeve, which in turn causes upward pivotal movement of said short arms and outward movement of said lateral U-shaped frames to thereby cause said tent to take a taut position in the fully open position of said cover.

12. A trailer camper as claimed in claim 11, wherein said last-named cable means also serve to stay said central frame in upright position in the fully open position of said cover, and including guy wires attached to said box and to said central frame and staying said central frame in upright position.

13. A trailer camper comprising a wheel-mounted open top box, hitching means secured to said box for hitching the latter to a towing vehicle, a cover for closing said box, said cover and box having a hinged connection for pivotal movement of said cover between a closed position and an open position in which latter position, said cover is adapted to lie on the ground besides the box and in upside down position at a lower level than the bottom of the box, a tent-supporting framework mounted in said box and a tent carried by said framework and attached to said box and cover, said framework and tent automatically taking an erected position upon opening of said cover and automatically taking a collapsed position upon closing of said cover and stored in the closed box, said tent-supporting framework including inverted U-shaped frames disposed longitudinally of said box and including a central frame and a pair of lateral frames, the legs of said central frame being pivotally connected to said box adjacent the back and front thereof and adjacent said hinged connection, a pair of short arms pivotally connected at one end to each leg of said central U-shaped frame, the legs of said lateral U-shaped frames being pivotally connected to the outer ends of said arms, a sleeve slidably mounted on each leg of said central U-shaped frame, links pivotally connecting said sleeve to said short arms, cable means attached to said cover and to said sleeve and trained intermediate their ends to the legs of said central frame above the pivotal connection of said short arms to said central frame, said last-named cable means causing, during opening of said cover, upward movement of said sleeve, which in turn causes upward pivotal movement of said short arms and outward movement of said lateral U-shaped frames to thereby cause said tent to take a taut position in the fully open position of said cover.

14. A trailer camper as claimed in claim 13, wherein said last-named cable means also serve to stay said central frame in upright position in the fully open position of said cover, and including guy wires attached to said box and to said central frame and staying said central frame in upright position.

15. A trailer camper comprising a wheel-mounted open top box, hitching means secured to said box for hitching the latter to a towing vehicle, a cover for closing said box, said box and cover having lateral walls with unequal height, and inclined end walls extending from the higher of said lateral walls to the lower of said lateral walls, the higher lateral wall of said cover being hinged to a lower lateral wall of said box, said cover being pivotable relative to said box between a closed position in which said walls fit one another in substantial alignment, and an open position in which said cover lies in side by side relationship and parallel with said box in upside down position at a lower level than the bottom of said box, a tent-supporting framework mounted in said box and a tent carried by said framework and attached to said box and cover, a linkage between the box and the cover and between the frame members of the framework, and fluid operable reversible motor means connected to said linkage and operable to move the cover relatively to the box between a closed position and an open position and to erect and collapse the framework during those movements and wherein said linkage is located close to an end wall of the box and includes a first lever pivotally connected to the base of the box and a second lever pivotally connected to the cover, the first and second levers being pivotally interconnected and the linkage being connected to the reversible motor means so that upon actuation of that motor means in one direction the linkage is extended to open the cover and upon actuation of that motor means in the reversed direction the linkage is contracted to close the cover, and in which the pivotal interconnection between the first and second levers is made by other levers arranged in the form of a lazy tong linkage.

16. A trailer camper comprising a wheel-mounted open top box, hitching means secured to said box for hitching the latter to a towing vehicle, a cover for closing said box, said box and cover having lateral walls with unequal height, and inclined end walls extending from the higher of said lateral walls to the lower of said lateral walls, the higher lateral wall of said cover being hinged to a lower lateral wall of said box, said cover being pivotable relative to said box between a closed position in which said walls fit one another in substantial alignment, and an open position in which said cover lies in side by side relationship and parallel with said box in upside down position at a lower level than the bottom of said box, a tent-supporting framework mounted in said box and a tent carried by said framework and attached to said box and cover, a linkage between the box and the cover and between the frame members of the framework, and fluid operable motor means connected to said linkage and operable to move the cover relatively to the box between a closed position and an open position and to erect and collapse the framework during these movements and wherein said motor means is reversible and comprises a double-acting hydraulic piston and cylinder device; said camper including a source of hydraulic fluid under pressure common to both sides of the double-acting piston and cylinder, a valve member for connecting that source to one or other of the sides of the piston, said source of fluid under pressure including an electric motor and a switch for energizing and de-energizing said motor, said switch being operable by a control member which also operates the valve.

17. A trailer camper as claimed in claim 16 including a second control member associated with said motor, said member being connected to a movable part of the camper and trailer and operable to de-energize the motor means when the cover reaches a position in which it will continue its opening and closing movements under the influence of gravity.

18. A trailer camper as claimed in claim 17 in which said control member comprises a lever operatively connected to a contact of said switch.

19. A trailer camper comprising an open top box, a cover hingedly connected to the box and movable between a first position in which it closes the box and a second position in which it is in side by side relationship with the box and in a plane generally parallel with the plane of the base of the box, an extensible linkage connecting the box and the cover and comprising a first lever pivotally connected to the box and a second lever pivotally connected to the cover, a pivotal connection between the first and second levers and a double-acting piston and cylinder connected to the linkage and operable to move the cover to its first position from its second position upon operation in one direction and to its second position from its first position upon operation in the other direction; said camper including a source of hydraulic fluid under pressure common to both sides of the double-acting piston and cylinder, a valve member for connecting that source to one or other of the sides of the piston, said source of fluid under pressure including an electric motor and a switch for energizing and de-energizing said motor, said switch being operable by a control member which also operates the valve; said camper also including a second control member associated with said motor, said member being connected to a movable part of the camper and trailer and operable to de-energize the motor means when the cover reaches a position in which it will continue its opening and closing movements under the influence of gravity.

References Cited
UNITED STATES PATENTS

| | | | |
|---|---|---|---|
| 3,323,827 | 6/1967 | Lundby | 296—23 |
| 2,549,266 | 4/1951 | Troden | 296—23.5 |
| 1,895,933 | 1/1933 | Kuns | 296—23.5 |
| 3,236,554 | 2/1966 | Cline | 296—26 |
| 2,629,339 | 2/1953 | Kovachick | 52—64 X |
| 3,180,510 | 4/1965 | Moller | 52—64 X |
| 2,714,524 | 8/1955 | Swiggum | 296—23 |

PHILIP GOODMAN, Primary Examiner

U.S. Cl. X.R.

135—1